US008244730B2

(12) United States Patent
Gupta

(10) Patent No.: US 8,244,730 B2
(45) Date of Patent: Aug. 14, 2012

(54) LEARNING SYNTACTIC PATTERNS FOR AUTOMATIC DISCOVERY OF CAUSAL RELATIONS FROM TEXT

(75) Inventor: Rakesh Gupta, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/754,966

(22) Filed: May 29, 2007

(65) Prior Publication Data
US 2007/0282814 A1    Dec. 6, 2007

Related U.S. Application Data

(60) Provisional application No. 60/809,780, filed on May 30, 2006.

(51) Int. Cl.
*G06F 17/30* (2006.01)
(52) U.S. Cl. ............................ 707/737; 707/742; 706/55
(58) Field of Classification Search ...... 704/1; 707/737, 707/739, 742
See application file for complete search history.

(56) References Cited

U.S. PATENT DOCUMENTS

| 6,076,088 A * | 6/2000 | Paik et al. ........................... 707/5 |
| 6,745,161 B1 * | 6/2004 | Arnold et al. ...................... 704/7 |
| 2002/0116169 A1 * | 8/2002 | Ait-Mokhtar et al. ............ 704/1 |
| 2003/0004915 A1 * | 1/2003 | Lin et al. .......................... 707/1 |
| 2005/0049852 A1 * | 3/2005 | Chao .................................. 704/9 |
| 2005/0182736 A1 * | 8/2005 | Castellanos ..................... 705/80 |
| 2006/0095248 A1 * | 5/2006 | Menezes et al. ................. 704/3 |

OTHER PUBLICATIONS

Cole et al., "A Lightweight Tool for Automatically Extracting Causal Relationships from Text", Mar. 2005.*
Snow et al., "Learning syntactic patterns for automatic hypernym discovery", 2005.*
Bröker et al., "Word Order without Phrase Structure: A Modal Logic for Dependency Grammar", 1997.*
Chang et al., "Causal Relation Extraction Using Cue Phrase and Lexical Pair Probabilities", 2005, Springer-Verlag Berlin Heidelberg.*
PCT International Search Report and Written Opinion, PCT/US2007/069926, Jul. 7, 2008.

* cited by examiner

*Primary Examiner* — Shahid Alam
*Assistant Examiner* — Dawaune Conyers
(74) *Attorney, Agent, or Firm* — Fenwick & West LLP; Mark E. Duell

(57) ABSTRACT

The present invention provides a method for extracting relationships between words in textual data. Initially, training relationship data, such as word triplets describing a cause-effect relationship, is received and used to collect additional textual data including the training relationship data. Distributed data collection is used to receive the training data and collect the additional textual data, allowing a broad range of data to be acquired from multiple sources. Syntactic patterns are extracted from the additional textual data and a distributed data source is scanned to extract additional relationship data describing one or more causal relationships using the extracted syntactic patterns. The extracted additional relationship data is then stored, and can be validated by a supervised learning algorithm before storage and used to train a classifier for automatic validation of additional relationship data.

19 Claims, 5 Drawing Sheets

LEARNING SYNTACTIC PATTERNS FOR AUTOMATIC DISCOVERY OF CAUSAL RELATIONS FROM TEXT

RELATED APPLICATIONS

This application claims priority from U.S. provisional application No. 60/809,780, filed on May 30, 2006, which is incorporated by reference herein in its entirety.

FIELD OF THE INVENTION

This invention relates generally to machine learning, and more particularly to a system and method for extracting relational data from text.

BACKGROUND OF THE INVENTION

Identification and classification of actions is of interest in machine learning applications as it provides a mechanism for training robots of the consequences of different actions. For example, data describing causal relationships can be used to specify how different actions affect different objects. Such relational data can be used to generate a "commonsense" database for robots describing how to interact with various types of objects.

However, conventional techniques for acquiring cause-effect relationships are limited. Existing distributed collection techniques receive relationship data from volunteers, which provides an initial burst of data collection. However, over time, data collection decreases to a significantly lower amount. Hence, conventional data collection methods are not scalable to provide a continuous stream of data.

What is needed is a system and method for automatically extracting causal relations from gathered text.

SUMMARY OF THE INVENTION

The present invention provides a method for extracting relationships, such as cause-effect relationships, from text data. In one embodiment, training data describing relationships between an object and an action is received and used to collect textual data including the training data. For example, the received training data comprises triplets of words describing an object, an action and an effect and textual data including the triplet is collected. In one embodiment, distributed data collection, such as Internet-based collection or multi-user collection, is used to collect the textual data from multiple sources. A syntactic pattern, such as a dependency tree, is then extracted from the collected textual data and used to identify relationships within the collected textual data. A distributed data source is then scanned and the extracted syntactic pattern is used to extract a relationship between an action and an object from the distributed data source. The extracted relationships are then stored in a computer storage media to generate a triplet data store. This allows relationship data to be collected and identified from automatically collected textual data, providing a scalable data collection method.

In an embodiment, a syntactic pattern is extracted by first preprocessing the textual data to resolve pronouns by identifying the noun associated with the pronoun. A dependency tree is then generated that describes relationships between words within the textual data. Satellite links are then inserted into the dependency tree to identify relationships other than those along the base paths of the dependency tree. In one embodiment, word order data is inserted into the dependency tree to indicate the order of the components of the related data, so that relationships including the same words in different orders can be differentiated.

In an embodiment, the stored extracted relationships are used to train a classifier to automatically identify valid triplets. For example, the stored extracted relationships are validated and the validation results are used for classification of additional triplets as valid or invalid. In one embodiment, a user manually determines whether or not a stored extracted relationship is valid. Alternatively, predefined data is used to determine whether or not a stored extracted relationship is valid.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

Figure 1:
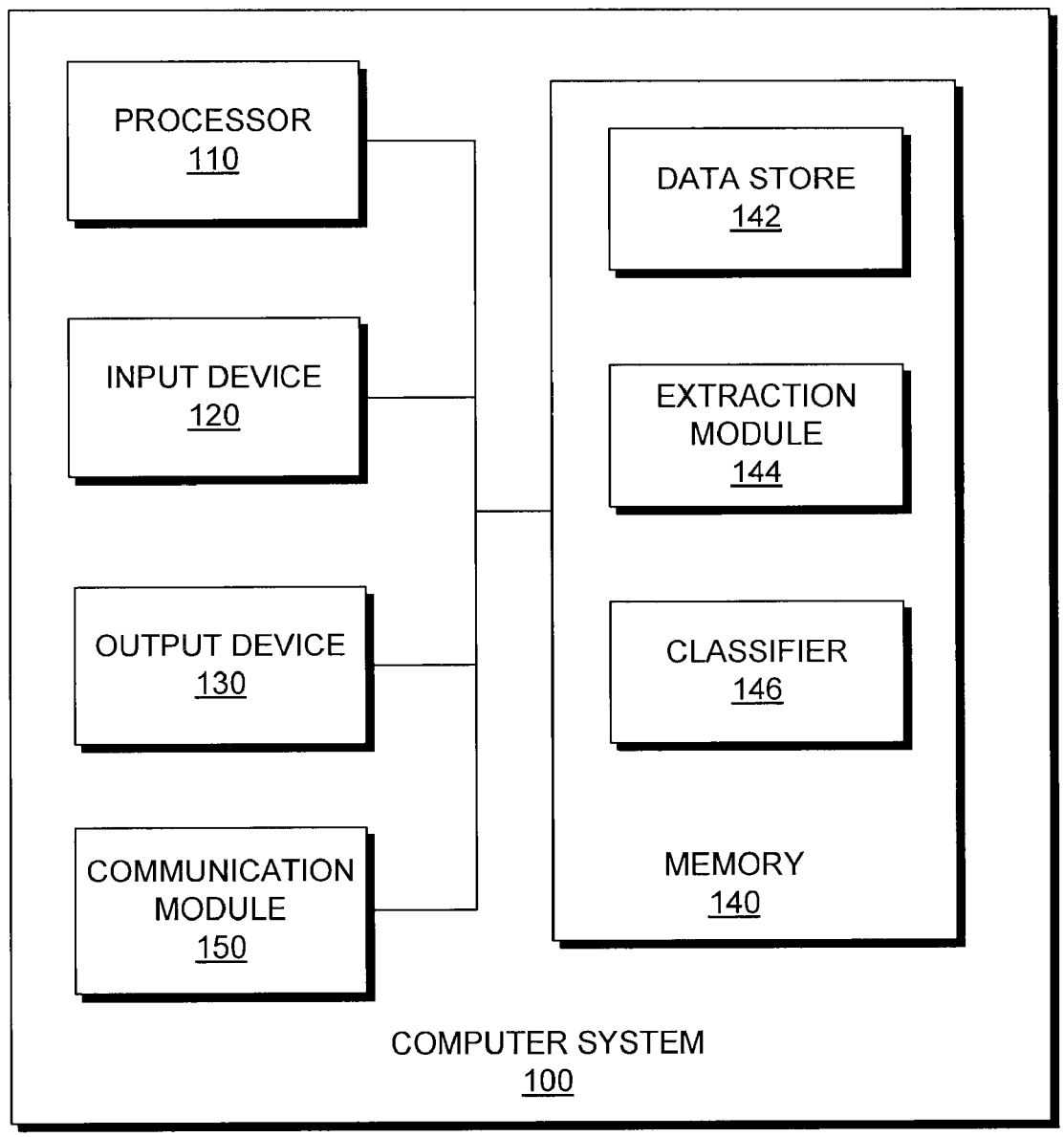
FIG. 1 is a computer system according to one embodiment of the present invention.

A preferred embodiment of the present invention is now described with reference to the Figures where like reference numbers indicate identical or functionally similar elements. Also in the Figures, the left most digit of each reference number corresponds to the Figure in which the reference number is first used.

Reference in the specification to "one embodiment" or to "an embodiment" means that a particular feature, structure or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

FIG. 1 is an illustration of a computer system 100 in which one embodiment of the present invention may operate. The computer system 100 includes a processor 110, an input device 120, an output device 130, a memory 140 and a communication module 150.

The processor 110 processes data signals and may comprise various computing architectures such as a complex instruction set computer (CISC) architecture, a reduced instruction set computer (RISC) architecture, or an architecture implementing a combination of instruction sets. Although only a single processor is shown in FIG. 1, multiple processors may be included. The processor 110 comprises an arithmetic logic unit, a microprocessor, a general purpose computer, or some other information appliance equipped to transmit, receive and process electronic data signals from the memory 140, the input device 120, the output device 130 or the communication module 150.

The input device 120 is any device configured to provide user input to the computer system 100 such as a cursor controller or a keyboard. In one embodiment, the input device 120 can include an alphanumeric input device, such as a keyboard (e.g., a QWERTY keyboard), a key pad or representations of such created on a touch-sensitive screen, adapted to communicate information and/or command selections to processor 110 or memory 140. In another embodiment, the input device 120 is a user input device equipped to communicate positional data as well as command selections to processor 110 such as a joystick, a mouse, a trackball, a stylus, a pen, a touch screen, cursor direction keys or other mechanisms to cause movement adjustment of an image.

The output device 130 represents any device equipped to display electronic images and data as described herein. Output device 130 may be, for example, an organic light emitting diode display (OLED), a liquid crystal display (LCD), a cathode ray tube (CRT) display, or any other similarly equipped display device, screen or monitor. In one embodiment, output device 130 is also equipped with a touch screen in which a touch-sensitive, transparent panel covers the screen of output device 130.

The memory 140 stores instructions and/or data that may be executed by processor 110. The instructions and/or data may comprise code for performing any and/or all of the techniques described herein. Memory 140 may be a dynamic random access memory (DRAM) device, a static random access memory (SRAM) device, Flash RAM (non-volatile storage), combinations of the above, or some other memory device known in the art. The memory 140 comprises a data store 142, an extraction module 144 and a classifier 146, and is adapted to communicate with the processor 110, the input device 120, the output device 130 and/or the communication module 150.

The data store 142 stores reference data describing causal relationships between actions and objects. For example, the data store 142 stores grouped triplets of text describing the effect of performing an action on an object by indicating the object, the action and the resulting effect. Hence, triplets such as "(car, sell, sold)," "(drink, refrigerated, chilled)," "(ball, pushed, roll)" are stored to describe how various actions affect different objects. Alternatively, the data store 142 includes textual sentences describing the result of an action applied to an object. However, the above descriptions are merely examples and the data store 142 can include any information capable of describing or identifying a causal relationship between an object, an action and a result.

The extraction module 144 provides information about extracting cause-effect relationships from textual data. By extracting data from text, the system automatically acquires and learns causal relationships from received text, increasing the number and type of relationships that can be identified. Hence, text data, such as sentences, is acquired from a distributed collection system that acquires data from multiple sources, such as the Internet or multiple users, and the extraction module 144 determines whether the acquired data includes a causal relationship. For example, the extraction module 144 includes data describing how to generate a dependency path or tree by parsing the received text data or any other method for identifying syntactic patterns within the acquired data. For example, the extraction module 144 parses text data to identify sentence structure, such as "If-Then," "When-Then" or other similar structures. Although described above with regard to identifying syntactic patterns or generating a dependency tree, the extraction module 144 can include instructions for determining any characteristic of received data capable of identifying causal relationships.

The classifier 146 provides information on determining the validity of the extracted causal relationships. For example, the classifier 146 includes instructions for applying a supervised learning algorithm to examine features of the extracted relationships. In one embodiment, the classifier 146 determines whether the extracted causal relationships satisfy at least one of the causal relationships stored in the data store 142. For example, the classifier applies a set of predetermined, or manually provided, rules describing the validity of relationship triplets in lexical patterns to classify additional triplets as valid or invalid. Alternatively, the classifier presents data describing relationships between lexical patterns and relational triplets to a user for manual specification of triplet validity with respect to each lexical pattern. In one embodiment, relationships between the initial relational data and the extracted relational data are used to modify the classifier algorithm using, for example, sparse binary logistic regression as described in Komarek and Moore, "Fast Robust Logistic Regression for Large Sparse Datasets with Binary Outputs" provided in http://www.autonlab.org/autonweb/14618/version/3/part/5/data/komarek: cglr.pdf?branch=main&language=en. However, the above descriptions are merely examples and the classifier can include any information capable of determining whether or not the extracted data includes data describing an effect of an action on an object.

The computer system 100 further comprises a communication module 150 which links the computing device 100 to a network (not shown), or to other computer systems 100. The network may comprise a local area network (LAN), a wide area network (WAN) (e.g., the Internet), and/or any other interconnected data path across which multiple devices may communicate. In one embodiment, the communication module 150 is a conventional wired connection, such as USB, IEEE 1394 or Ethernet, to other computer systems 100 for distribution of files and information. In another embodiment, the communication module 150 is a conventional type of transceiver, such as for infrared communication, IEEE 802.11 a/b/g/n (or WiFi) communication, Bluetooth® communication, 3G communication, IEEE 802.16 (or WiMax) communication, or radio frequency communication. Alternatively, the communication module 150 comprises a combination of a transceiver and a wired connection.

It should be apparent to one skilled in the art that computer system 100 may include more or less components than those shown in FIG. 1 without departing from the spirit and scope of the present invention. For example, computer system 100 may include additional memory, such as, for example, a first or second level cache, or one or more application specific integrated circuits (ASICs). Similarly, computer system 100 may include additional input or output devices. In some embodiments of the present invention one or more of the components (110, 120, 130, 140, 142, 144, 146, 150) can be positioned in close proximity to each other while in other embodiments these components can be positioned in geographically distant locations. For example the units in memory 140 can be programs capable of being executed by one or more processors 110 located in separate computer systems 100.

Figure 2:
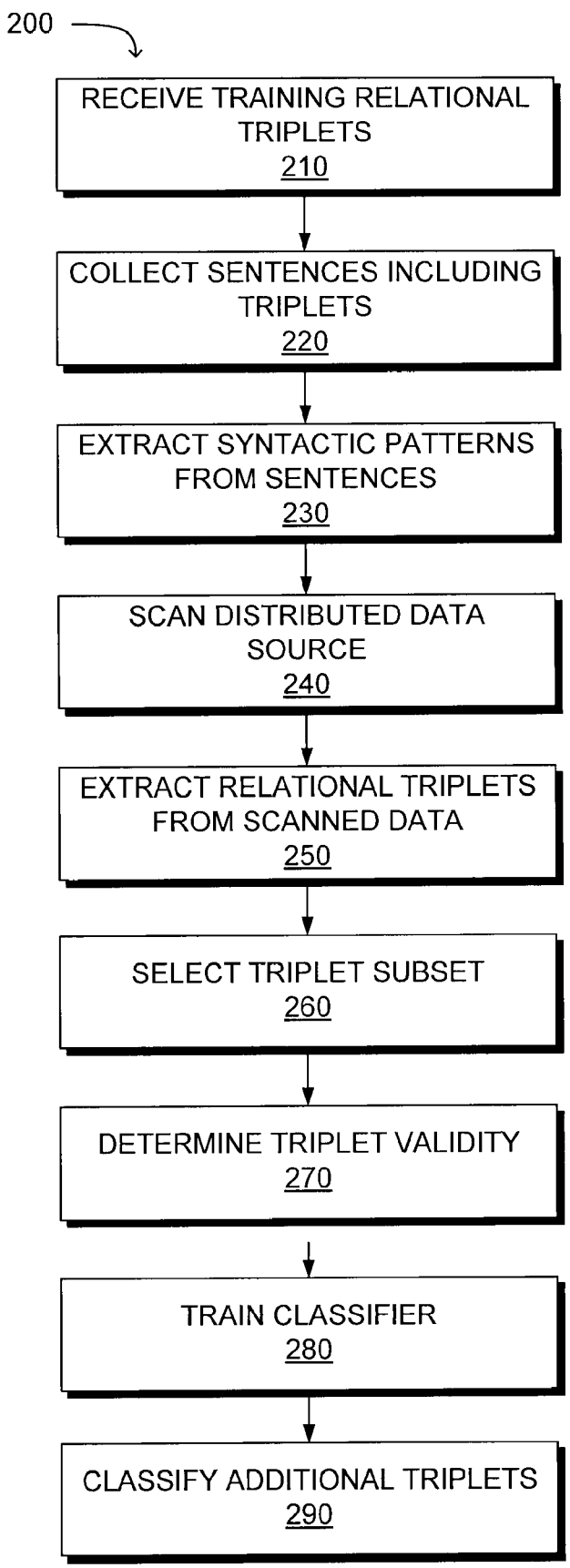
FIG. 2 is a flowchart illustrating a method for extracting causal relationships from text data according to one embodiment of the present invention.

FIG. 2 is a flowchart illustrating a method for extracting causal relationships from text data according to one embodiment of the present invention. In one embodiment, the computer system 100 initially receives 210 training relational data, such as relational triplets using a distributed capture technique. For example, the computing system 100 receives 210 relational triplets (e.g., "(balloon, released, floating)," "(battery, discharged, dead)," "(drink, refrigerated, chilled)," etc.) from multiple users describing effects of actions on objects through the input device 120 or the communication module 150. In one embodiment, the received relational triplets have a predetermined form, such as "(object, cause, effect)." Alternatively, the received relational triplets are extracted from input text, such as sentences, using dependency parsing techniques such as the principle and parameter based parser ("MINIPAR") described in Lin, "Dependency-Based Evaluation of MINIPAR," in *Workshop on the Evaluation of Parsing Systems*, which is herein incorporated by reference in its entirety, or any type of lexico-syntactic parsing identifying relationships between words. By using a distributed capture technique, the computer system 100 acquires data from a variety of different sources, increasing the amount and type of relational data acquired.

The computing system 100 then uses the received relational triplets to collect 220 additional text data, such as sentences, also using distributed data collection methods to collect 220 data from multiple sources. Text data is collected 220 to obtain additional data including at least one of the initially received triplets. For example, text data including all three words in a triplet is collected 220 from distributed sources or data where all words in a triplet are within 10 successive words is collected 220. In one embodiment, the communication module 150 collects 220 additional text data from the users or sources that provided the training relational triplets. Alternatively, the initially received relational triplets are used to extract data including triplet components from the Internet or another source including data from multiple sources such as a multi-user database (e.g., a Text Retrieval Conference (TREC) corpus). In another embodiment, a combination of Internet data acquisition and user data acquisition is used to collect 220 the additional text data.

Syntactic patterns are extracted 230 from the collected text data. In one embodiment, a dependency tree representing the syntactic relations between words in the text data is generated using a dependency parser such as the MINIPAR parser or another suitable lexico-syntactic parsing method capable of identifying syntactic relationships (e.g., subject, object, predicate, etc.) between words. For example, the dependency tree represents syntactic relationships between words using tuples of the form (category, relation, category). The categories classify a word according to part of speech (e.g., noun, verb, etc.) and the relations classify a directed syntactic relationship between two words (e.g., subject, object, etc.). In one embodiment, the dependency tree is further processed to allow identify additional relationship data. An example of a dependency tree and of the additional dependency tree processing is described below in conjunction with FIG. 3. The syntactic relationships described by the dependency tree are used to identify syntactic patterns, such as sentence structure (e.g., "If-Then," "When-Then") in the collected text data.

A distributed data source is then scanned 240 and the extracted syntactic patterns are used to extract 250 relational triplets from the data source. In one embodiment, paths in the dependency tree are used to determine relationships in the text data and identify relational triplets having the same syntactic pattern. For example, relational triplets are extracted 250 from sentences within the distributed data source having an "If-Then" structure and including at least one of the training relational triplet words. A subset of the extracted triplets is then selected 260. In one embodiment, the triplets are manually selected by a user. Alternatively, the triplets are automatically selected using predetermined or specified criteria. In another embodiment, a random subset of triplets is selected.

A supervised learning algorithm is then used to determine 270 the validity of the selected triplets. For example, the learning algorithm associates relational triplets with syntactic patterns and indicates the number of times a relational triplet appears in different syntactic patterns. In one embodiment, a user manually specifies triplet validity based on the syntactic pattern and relational triplet associations. Alternatively, specified criteria are used to automatically determine 270 triplet validity. The validity data of the selected triplets is then used to train 280 a classifier for automatically determining validity of additional triplets. In one embodiment, the classifier is trained 280 using sparse binary logistic regression, such as the Fast Robust Logistic Regression for Large Sparse Datasets with Binary Outputs algorithm. The trained classifier is then used to classify 290 additional triplets extracted 250 from the scanned data. Optionally, classifier performance is then evaluated by comparing the classifier results to manually classified relational data to determine classifier accuracy Thus, initially provided training triplets are used to collect sentences used to generate syntactic patterns. The generated syntactic patterns are used to extract additional relational triplets from a distributed data source, such as a multi-user database, the Internet or another source. A subset of the extracted relational triplets are selected and used to train a classifier for determining triplet validity. This provides a scalable method for acquiring relational data from collected text.

Figure 3:
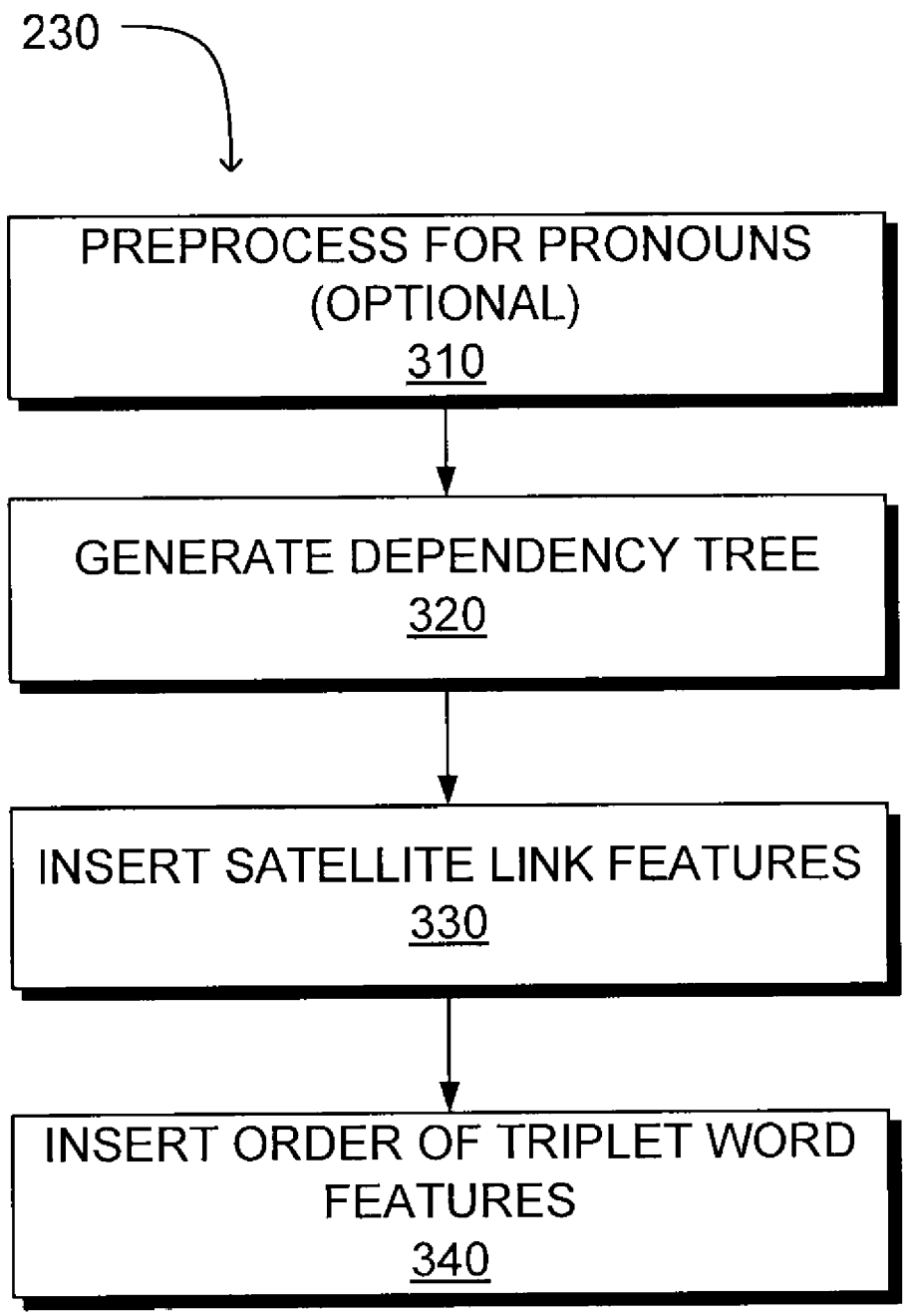
FIG. 3 is a flowchart illustrating a method for generating a feature vector describing an observed action according to one embodiment of the present invention.

FIG. 3 is a flowchart illustrating a method for extracting 230 syntactic patterns from textual data according to one embodiment of the present invention. In one embodiment, the text data is preprocessed 310 to resolve third-person pronouns, which increases the number and type of lexical patterns that can be identified. For example, an anaphora resolution process, such as the Resolution of Anaphora Procedure (RAP) described in Lapin and Leass, "An Algorithm for Pronominal Anaphora Resolution," *Computational Linguistics* 20(4): 539-545, which is incorporated by reference herein in its entirety or other similar technique, is applied to resolve third person pronouns, resolve lexical anaphors and identify pleonastic pronouns. By resolving third person pronouns, the preprocessing identifies the noun associated with the resolved pronoun. The example sentence "When water is heated, it boils," illustrates how preprocessing 310 identifies causal relationships. Without preprocessing, syntactic pattern extraction identifies that "water" and "heated" are related and that "it" and "boils" are related, but does not find a relationship between "water" and "it." However, preprocessing identifies the relationship between "water" and "it," allowing detection of the complete causal relationship of ("water," "heated," "boils").

Figure 4:
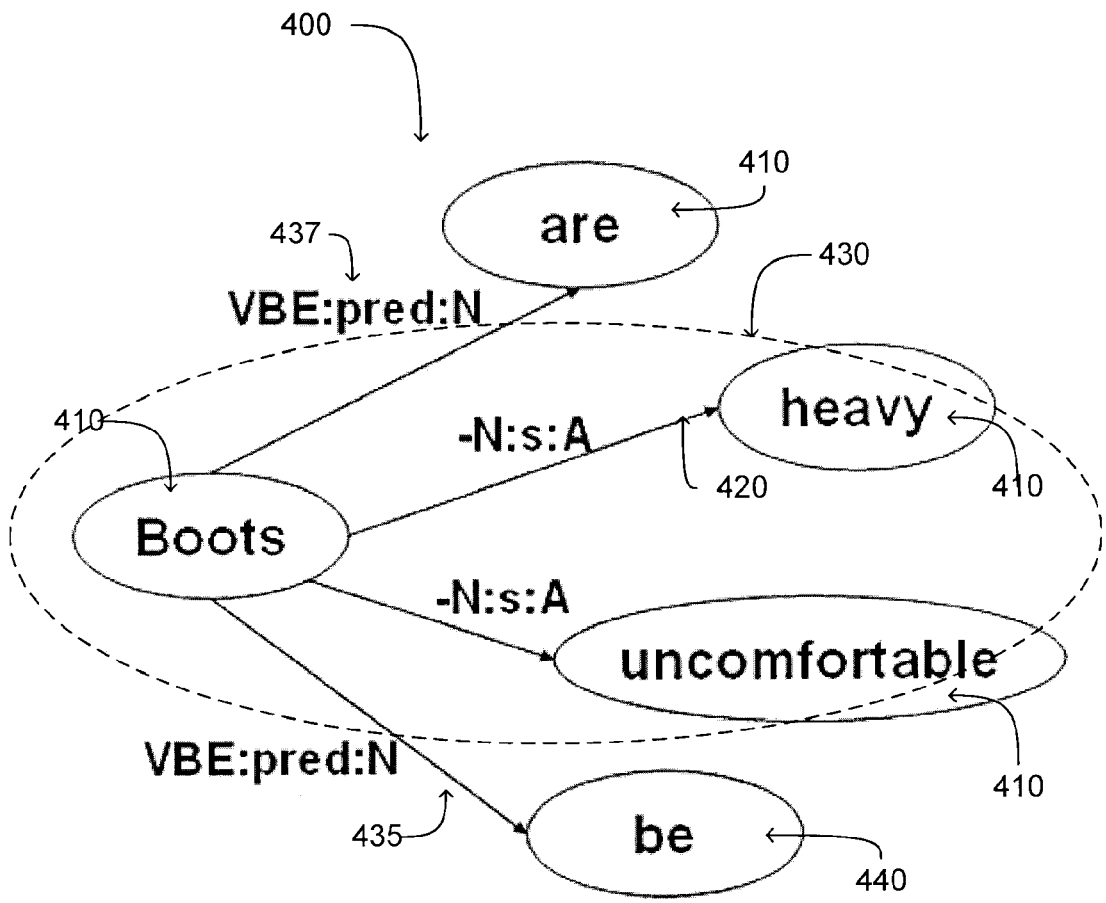
FIG. 4 is an example dependency tree according to one embodiment of the present invention.

A dependency tree is then generated 320 from the preprocessed text data using a dependency parser as described above in conjunction with FIG. 2. In one embodiment, the dependency parser categorizes words as parts of speech and categorizes the type of syntactic relation between the data. In one embodiment, the dependency tree is generalized by removing the original triplet words. In another embodiment, the dependency tree is restricted so identified objects are nouns and identified causes and/or effects are adjectives or verbs to expedite dependency tree generation. FIG. 4, further described below, shows an example dependency tree generated 320 for the sentence "Boots that are heavy can be uncomfortable," and identifies the elements of the example dependency tree.

Satellite links are then inserted 330 into the generated dependency tree to identify additional links in the text data. Conventional dependency parsers indicate the basic lexical path in a sentence, but do not identify links other than those along the basic dependency path. This prevents conventional parsing techniques from using common words, such as "be" or "is" to determine lexical relationships between words in a sentence. Satellite link insertion allows identification of additional syntactic relationships t in the text data but not in the basic dependency path. The example dependency tree described in conjunction with FIG. 4 below shows insertion of satellite links into the dependency tree for the example sentence "Boots that are heavy can be uncomfortable."

Data describing the order of the triplet words is then inserted 340 into the generated dependency tree. As a lexical path can correspond to triplets from different data having the same terms in a different order, word order data is used to distinguish between differently ordered triplets, such as those having the form (effect, object, cause) or (cause, object, effect). Hence, if lexical paths are identified in different dependency trees with the same words in a different order, the order data allows for differentiation between the similar triplets.

FIG. 4 shows an example dependency tree 400 according to one embodiment of the present invention. For purposes of illustration, the example dependency tree describes the sentence "Boots that are heavy can be uncomfortable."

The dependency tree includes nodes 410 representing the words comprising the sentence. Links 420 represent the syntactic relation between words, and are labeled to describe the relationship. In one embodiment, the links 420 are labeled using tuples of the form "category:relation:category," where "category" indicates a part of speech (e.g., noun, verb, etc.) and "relation" indicates a directed syntactic relationship (e.g., object, subject, conjunction, etc.) between the two categorized words. In one embodiment, abbreviations such as "N" for noun, "VBE" for verb, "A" for adjective "s" for subject, "pred" for predicate and other suitable abbreviations are used to describe the category and relation. For example, link 420 is labeled "-N:s:A," indicating that "heavy," an adjective, is a subject of "boots," a noun.

FIG. 4 also illustrates the addition of satellite links 435, 437 to the basic lexical path of the dependency tree 400 to identify links other than those within the basic dependency path. In the example of FIG. 4, the basic lexical path 430 shows that "heavy" is a subject of "boot" and similarly "uncomfortable" is a subject of "boot," which comprises the shortest lexical path connecting "boot" and "uncomfortable." However, the basic lexical path 430 does not capture that common words, such as "be" are useful indicators of lexical relationships among words in a sentence. By adding satellite links 435, 437 additional words in the immediate vicinity of the end nodes are added to provide additional indicators of lexical relationships. In FIG. 4, satellite links 435,437 describing the relationship between "boots" and "be" are added to the dependency tree. For example, in FIG. 4 satellite link 437 indicates that "boots," a noun, has a predicate ("pred") relationship to "are," a verb. As "be" is the lemma stem of "are," adding satellite link 435 to show the relationship between "boots" and "be" also adds satellite link 437 describes the relationship between "boots" and "are."

Figure 5:
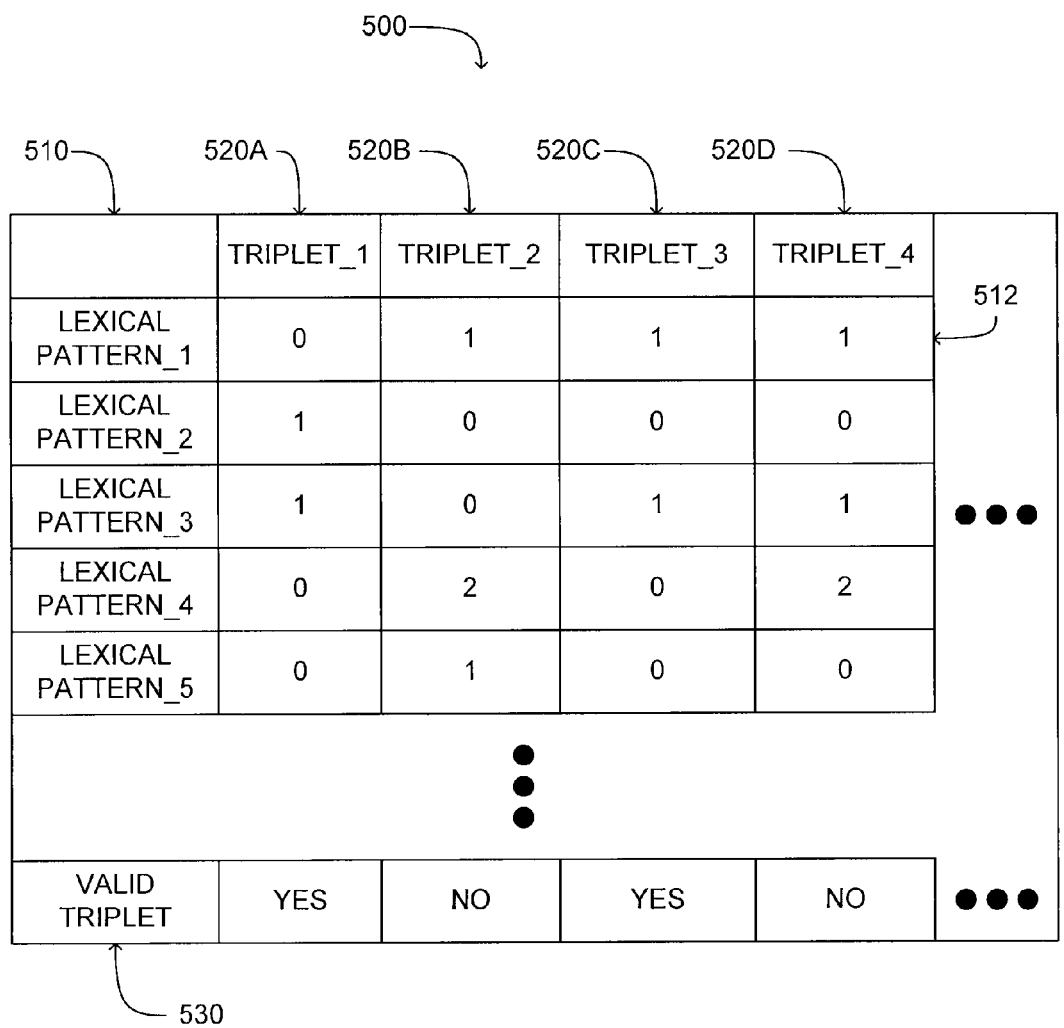
FIG. 5 is an example of classifier training input according to one embodiment of the present invention.

FIG. 5 shows an example classifier input 500 according to one embodiment of the present invention. In the example shown in FIG. 5, the classifier input 500 comprises a table describing relationships between different triplets 520A-520D and lexical patterns 510. However, the tabular format shown in FIG. 5 is merely an example and in various embodiments the classifier input 500 comprises any suitable format.

In one embodiment, the classifier input indicates a frequency in which different triplets 520A-520D appear in various lexical patterns 510. For example, row 512 indicates that $Triplet\_1_{occurs}$ 0 times in sentences having Lexical_Pattern_1, $Triplet\_2$ occurs 1 time in sentences having Lexical_Pattern_1, $Triplet\_3_{occurs}$ 3 times in sentences having Lexical_Pattern_3, and similarly indicates the frequency that different triplets occur in sentences having Lexical_Pattern_1.

The classifier input 500 also includes a triplet validity indicator 530 which uses a binary value to describe validity of each triplet 520A-520D. In one embodiment, the triplet validity indicator 530 is manually specified by a user based on evaluation of the triplet 520A-D and lexical pattern 510 frequency data. Alternatively, the triplet validity indicator 530 is generated by a software or firmware process using the triplet 520A-D and lexical pattern 510 frequency data as input.

In one embodiment, sparse binary logistic regression, such as such as the Fast Robust Logistic Regression for Large Sparse Datasets with Binary Outputs algorithm described in Komarek and Moore uses the classifier input 500 to train the classifier to automatically determine validity. Hence, relational triplets received after classifier training are automatically classified as valid using the results of the classifier training.

What is claimed is:

1. A computer-based method for extracting relationships from textual data, comprising the steps of:
   receiving, from a first distributed data source, training data comprising three or more words describing relationships between an action and an object;
   collecting textual data including the received training data from the first distributed data source;
   generating a dependency tree describing relationships between words of the textual data from a syntactic pattern extracted from the collected textual data;
   inserting satellite links and word order data into the dependency tree, the satellite links identifying links within the text data in addition to a basic lexical path and the word order data describing the order of words in the syntactic pattern;
   obtaining additional text data by scanning a second distributed data source, wherein the additional text data is not used in generating the dependency tree;
   extracting target causal relationships between one or more actions and one or more objects in the additional text data obtained from the second distributed data source by comparing the additional text data to the dependency tree and using the word order data;
   determining the validity of the target relationships;
   training a classifier to automatically determine the validity of target relationships in addition to the target relationships previously determined to be valid based at least in part on the target relationships previously determined to be valid; and
   storing the target relationships determined to be valid in a computer storage media.

2. The method of claim 1, wherein the training data comprises one or more triplets of words describing an object, an action and an effect of the action on the object.

3. The method of claim 1, wherein the step of generating the dependency tree comprises preprocessing the textual data to resolve pronouns.

4. The method of claim 1, wherein the validity of the target relationships is determined using a supervised learning algorithm to examine the features of the target relationships.

5. The method of claim 4, wherein the supervised learning algorithm applies a set of predetermined or manually provided rules describing the validity of causal relationships in lexical patterns to classify the target relationships as valid or invalid.

6. The method of claim 1, wherein the validity of the target relationships is determined by presenting the target relationships to a user for manual specification of validity.

7. The method of claim 1, wherein the classifier is trained based at least in part on the target relationships determined to be valid using sparse binary logistic regression.

8. A system for extracting relationships from textual data, the system comprising:
   an input device for receiving training data and first textual data from a first distributed data source;
   a data store, adapted to communicate with the input device, the data store for storing representations of the received training data;
   an extraction module, adapted to communicate with the data store and the input device for extracting a syntactic pattern from the first textual data using the received training data, generating a dependency tree describing relationships between words of the textual data from the syntactic pattern and inserting satellite links and word order data into the dependency tree, the satellite links identifying links within the text data in addition to a basic lexical path and the word order data describing the order of words in the syntactic pattern;
   a communication module adapted to communicate with the extraction module and a second distributed data source, the communication module for retrieving additional textual data from the second distributed data source and extracting causal relationships between one or more actions and one or more objects from the additional text data obtained from the second distributed data source by comparing the additional text data to the dependency tree and using the word order data, wherein the additional text data is not used in generating the dependency tree; and
   a classifier adapted to communicate with the extraction module, the communication module and the data store for classifying relationships described by the dependency tree and for determining whether the target causal relationships extracted from the second distributed text data source are valid or invalid, wherein the classifier is trained to automatically determine the validity of target relationships in addition to the target relationships previously determined to be valid based at least in part on the target relationships previously determined to be valid.

9. The system of claim 8, wherein the extraction module further preprocesses the text data to identify pronouns in the textual data.

10. The system of claim 8, wherein the target relationships are classified as valid or invalid using a supervised learning algorithm to examine the features of the target relationships.

11. The system of claim 10, wherein the supervised learning algorithm applies a set of predetermined or manually provided rules describing the validity of causal relationships in lexical patterns to classify the target relationships as valid or invalid.

12. The system of claim 8, wherein the classifier classifies the target relationships by presenting the target relationships to a user for manual specification of validity.

13. The system of claim 8, wherein the classifier is trained based at least in part on the target relationships classified as valid using sparse binary logistic regression.

14. A computer program product, comprising a non-transitory computer readable medium storing computer executable code for extracting relationships from textual data, the computer executable code performing the steps of:
   receiving, from a first distributed data source, training data comprising three or more words describing relationships between an action and an object;
   collecting textual data including the received training data from the first distributed data source;
   generating a dependency tree describing relationships between words of the textual data from a syntactic pattern extracted from the collected textual data;
   inserting satellite links and word order data into the dependency tree, the satellite links identifying links within the text data in addition to a basic lexical path and the word order data describing the order of words in the syntactic pattern;
   obtaining additional text data by scanning a second distributed data source, wherein the additional text data is not used in generating the dependency tree;
   extracting a target causal relationship between one or more actions and one or more objects in the additional text data obtained from the second distributed data source by comparing the additional text data to the dependency tree and using the word order data;
   determining the validity of the target relationship; and
   responsive to a determination of the validity of the target relationship:
      training a classifier to automatically determine the validity of target relationships in addition to the target relationship previously determined to be valid based on the target relationship; and
      storing the target relationship in the non-transitory computer-readable storage medium.

15. The computer program product of claim 14, wherein the step of generating the dependency tree comprises the step of:
   preprocessing the textual data to resolve pronouns.

16. The computer program product of claim 14, wherein the validity of the target relationship is determined using a supervised learning algorithm to examine the features of the target relationship.

17. The computer program product of claim 16, wherein the supervised learning algorithm applies a set of predetermined or manually provided rules describing the validity of causal relationships in lexical patterns to classify the target relationship as valid or invalid.

18. The computer program product of claim 14, wherein the validity of the target relationships is determined by presenting the target relationships to a user for manual specification of validity.

19. The computer program product of claim 14, wherein the classifier is trained based at least in part on the target relationship using sparse binary logistic regression.

* * * * *